(12) United States Patent
Milov

(10) Patent No.: US 7,787,651 B2
(45) Date of Patent: Aug. 31, 2010

(54) TRIANGULAR METHOD FOR HYPOTHESES FILTRATION IN A COGNITIVE CONTROL FRAMEWORK

(75) Inventor: Denis Sergeevich Milov, Kirishi (RU)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 10/582,928

(22) PCT Filed: Nov. 11, 2005

(86) PCT No.: PCT/RU2005/000558

§ 371 (c)(1),
(2), (4) Date: Jun. 13, 2006

(87) PCT Pub. No.: WO2007/055611

PCT Pub. Date: May 18, 2007

(65) Prior Publication Data

US 2009/0268968 A1 Oct. 29, 2009

(51) Int. Cl.
*G06K 9/46* (2006.01)

(52) U.S. Cl. ............... 382/100; 382/181; 382/201; 715/704

(58) Field of Classification Search ........... 382/100, 382/181, 201; 345/650, 661, 676; 715/700, 715/704
See application file for complete search history.

(56) References Cited

U.S. PATENT DOCUMENTS

| | | | | |
|---|---|---|---|---|
| 5,335,342 A | | 8/1994 | Pope et al. | |
| 5,748,499 A | * | 5/1998 | Trueblood | 702/187 |
| 6,445,390 B1 | * | 9/2002 | Aftosmis et al. | 345/421 |
| 6,542,638 B2 | * | 4/2003 | Campbell | 382/201 |
| 6,865,302 B2 | * | 3/2005 | Chang | 382/305 |
| 2003/0023952 A1 | | 1/2003 | Harmon, Jr. | |
| 2004/0194065 A1 | | 9/2004 | McGrath et al. | |
| 2005/0278728 A1 | * | 12/2005 | Klementiev | 719/328 |
| 2006/0005132 A1 | * | 1/2006 | Herdeg | 715/704 |

OTHER PUBLICATIONS

Daboczi et al. "How to Test Graphical User Interfaces." IEEE Instrumentation & Measurement Magazine, Sep. 2003, pp. 27-33.*
"Software Automation & Testing", Jun. 27, 2004 pp. 1-19, XP002383091 [retreived] May 29, 2006, <http://web.archive.org/web/20040627105104/http://www.redstonesoftware.com/EggplantOverview/Eggplant+Overview.pdf>.

(Continued)

Primary Examiner—Jon Chang
(74) Attorney, Agent, or Firm—Steven P. Skabrat

(57) ABSTRACT

Reducing the number of hypotheses for locations of an active object in a saved image generated by a graphical user interface (GUI) of an application program may be accomplished by determining possible triangles for the saved image, wherein vertices of the triangles are points where the active object and any two additional objects of the saved image are located, determining possible pairs of hypotheses corresponding to the two additional objects from a current playback image corresponding to the saved image, determining triangles corresponding to the possible pairs of hypotheses and filtering the detected triangles, determining vertices with weights for similar triangles of the current playback image, and calculating a weight for every hypothesis of the active object and filtering hypotheses of the active object on the current playback image based on a weight bound.

24 Claims, 19 Drawing Sheets

OTHER PUBLICATIONS

"AcuTest", Jul. 11, 2004 XP002383092 [retrevied] May 29, 2006, <http://web.archive.org/web/20040711080728/http://www.tevron.com/acutest.asp>.

"Eggplant Tutorial, for Use with a MAC OS X System-Under-Test, Eggplant Version 3.1", Redstone Software, Inc. XP-002397141,(Jun. 3, 2005),1-18.

"Software Automation and Testing", Redstone Software, Inc. XP 002383091,(Jun. 27, 2004),1-19.

Herron, David , "Accessibility for Test Automation", David Herron's Blog, XP-002388052.,(Jul. 19, 2005),1-3.

* cited by examiner

TRIANGULAR METHOD FOR HYPOTHESES FILTRATION IN A COGNITIVE CONTROL FRAMEWORK

CROSS-REFERENCE TO RELATED APPLICATION

This application is a National Phase application of, and claims priority to, International Application No. PCT/RU2005/000558, filed Nov. 11, 2005, entitled A TRIANGULAR METHOD FOR HYPOTHESES FILTRATION IN A COGNITIVE CONTROL FRAMEWORK

BACKGROUND

1. Field

The present invention relates generally to automatic control of software application programs and image analysis and, more specifically, to analyzing graphical user interface (GUI) images displayed by an application program for automatic control of subsequent execution of the application program.

2. Description

Typical application program analysis systems capture keyboard input data and mouse input data entered by a user. The captured input data may then be used to replay the application program. These systems rely on playback of the application program on the same computer system used to capture the input data, and thus are not portable.

Some existing application program analysis systems use image recognition techniques that are dependent on screen resolution and/or drawing schemes, or have strong dependencies to the underlying operating system (OS) being used. Such systems typically rely on dependencies such as Windows32 or X-Windows application programming interfaces (APIs). This limits their portability and usefulness.

Hence, better techniques for analyzing the GUIs of application programs are desired.

BRIEF DESCRIPTION OF THE DRAWINGS

The features and advantages of the present invention will become apparent from the following detailed description of the present invention in which:

FIG. 9 is an example image illustrating active and additional objects according to an embodiment of the present invention;

DETAILED DESCRIPTION

Embodiments of the present invention comprise a cognitive control framework (CCF) for automatic control of software application programs that have a graphical user interface (GUI). Examples of such applications programs may be executed on current operating systems such as Microsoft Windows® and Linux, for example, as well as other operating systems. An embodiment of the present invention creates a system simulating a human user interacting with the GUI of the application program and using the GUI for automatic control of the application program without relying on dependencies such as specific graphical libraries, windowing systems, or visual controls interfaces or implementations. The CCF comprises an easy-to-use cross-platform tool useful for GUI testing based on pattern recognition. By being independent of any OS-specific controls and graphical libraries, the CCF may be used for interaction with non-standard graphical interfaces as well as with well known ones. The system provides for recording any kind of keyboard and mouse actions the user performs while working with the GUI of the application program and then providing playback of the recorded scenario. In the present invention, image analysis of captured display data (such as screen shots, for example) is performed to identify actions of the application program corresponding to user input data. These actions and input data may be stored for use in future playback of the same user scenario for automatically interacting with the application program.

Embodiments of the present invention comprise operating on two phases: a recording phase and a playback phase. During the recording phase, the system is "learning" how to control the application program. The system registers and captures input actions supplied by the user (such as a mouse click or entering of text via a keyboard, for example) and display data (e.g. screen shots) of images displayed by the application program in response to those actions. The user actions, the time interval between actions, resulting display data of the GUI of the application program, and possibly other data and/or commands form an execution scenario. By following the execution scenario, during the playback phase the system provides the same but fully automatic execution of the application program (simulating the user control but without the real presence of the user). Automatic execution is made possible due to a plurality of image analysis and structural techniques applied correspondingly to images during the recording and playback phases.

Figure 1:
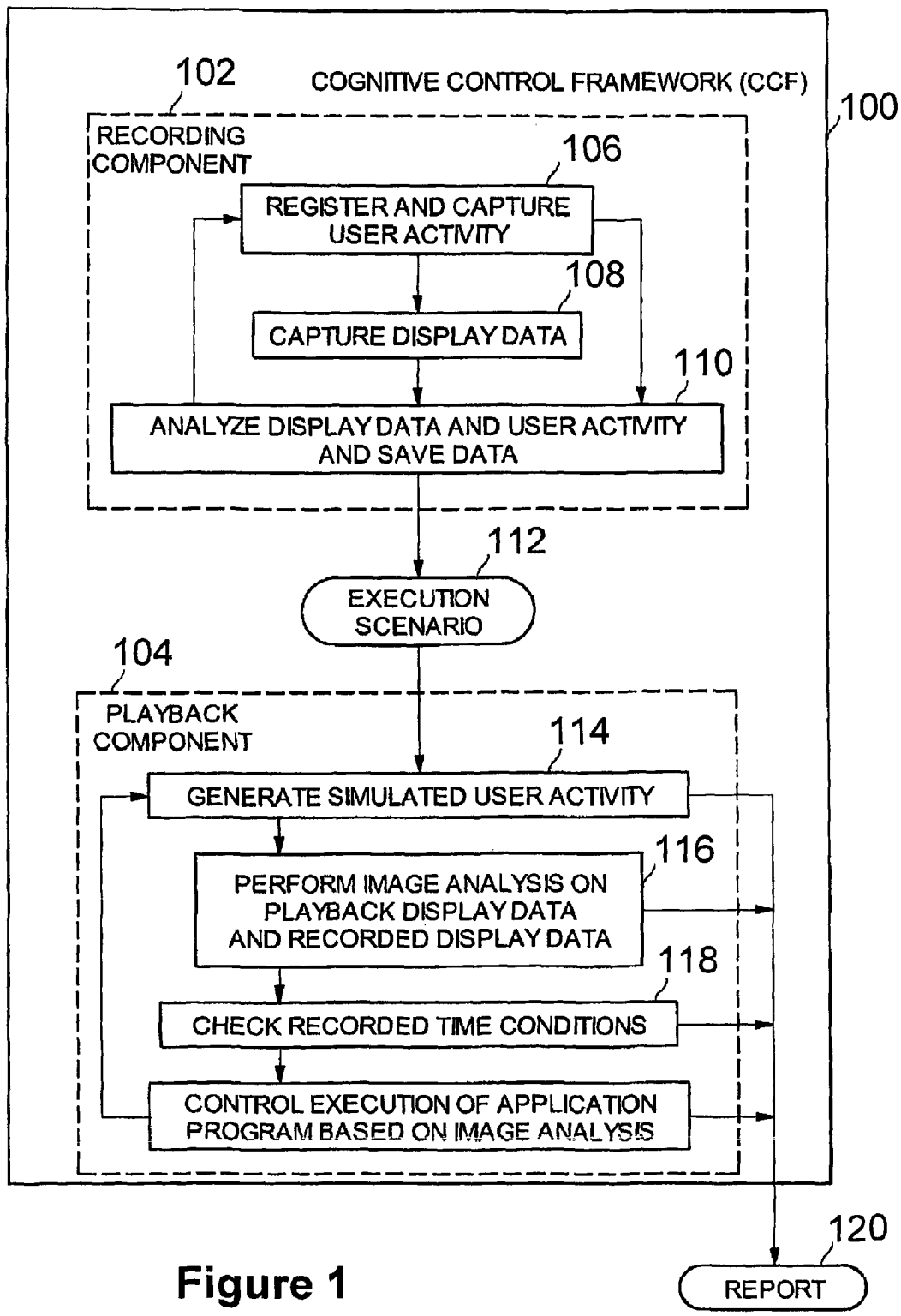
FIG. 1 is a diagram of a cognitive control framework system according to an embodiment of the present invention.

FIG. 1 is a diagram of a cognitive control framework (CCF) system 100 according to an embodiment of the present invention. FIG. 1 shows two components, recording component 102 and playback component 104. These components may be implemented in software, firmware, or hardware, or a combination of software, firmware and hardware. In the recording component, the CCF system registers and captures user input activity at block 106. For example, the user may make input choices over time to an application program being executed by a computer system using a mouse, keyboard, or other input device. This input data is captured and stored by the CCF system. Next, at block 108, the display data may be captured (e.g. screen shots are taken). In one embodiment, the display data may captured only when user input has been received by the application program. The display data is also saved. At block 110, the data captured during blocks 106 and 108 may be analyzed and saved. These processes may be repeated a plurality of times. The result of the processing of the recording component comprises an execution scenario 112 for the application program being processed by the system. In one embodiment, the execution scenario comprises a script containing Extended Markup Language (XML) tags. The execution scenario describes a sequence of user inputs to the application program, corresponding display images on a GUI of the application program, and commands directing the application program to perform some actions.

At a later point in time, during the playback phase the playback component 104 may be initiated. At block 114, simulated user activity may be generated based on the execution scenario. That is, saved inputs and commands from the execution scenario may be input to the application program for purposes of automatic control using the CCF system. While the application program processes this data, display data may be changed on the display as a result. At block 116, the CCF system performs image analysis on the playback display data currently being shown as a result of application program processing and the display data captured during the recording phase. At block 118, recorded time conditions may be checked to take into account possible variations in playback. For example, the time when an object appears may be within a time interval based on a recorded time. For example, in one embodiment a lower bound time (time to start the search) may be extracted from the saved data in the execution scenario and an upper bound time may be the lower bound time plus 10%, or some other appropriate value. Processing of blocks 114, 116, and 118 each result in data being stored in report 120. At block 119, the CCF system controls execution of the application program based on the results of the image analysis. Blocks 114, 116 and 118 may be repeated for each in a sequence of user input data items from the execution scenario.

The time interval between sequential actions is a part of the captured execution scenario. However, while following the execution scenario in the playback phase, one should not expect that the time interval between any two actions at playback will be equal to the time interval between the same two actions during the recording phase. There are a number of objective reasons why this interval could be different or playback than during recording. For example, the application program during recording and playback may be executed on different computer systems having different processor speeds, or an application program could require different times for the same actions during playback due to accesses of external data or resources. This indicates a requirement in the CCF system to handle flexible time conditions, e.g. handle some tolerance for the time interval between actions during the playback phase. During that time interval at playback, the system checks the recorded display data to the playback display data several times to determine if the playback display data is substantially similar to the recorded display data. A finding that the two are substantially similar indicates that a previous user action has completed and the system can progress to the next action in the execution scenario. This activity may be similar to the situation where the user is interacting with the application program and pauses periodically to view the display to determine if the expected visible changes to the display have beer made by the application program based on previous actions. If so, then a new action may be performed. If at the end of a higher bound of the time interval the application program has not produced an image on the display that the CCF system expected according to the execution scenario, then the CCF system may interrupt the playback of the execution scenario and generate an error report describing how the execution scenario has not been followed. In one embodiment, the scenario may be corrected and the CCF system may be required to use other branches to continue.

The cognitive control framework (CCF) system of embodiments of the present invention performs image analysis and object detection processing on display data from the GUI of the application program. The CCF system includes comparing an image captured during a recording phase (called IR) to the corresponding image captured during the playback phase (called IP). One task of the system is to detect an object in the IR to which the user applied an action, find the corresponding object in the IP, and continue progress on the execution path of the execution scenario by applying the action to the detected object. These steps may be repeated for multiple objects within an image, and may be repeated across multiple pairs of IRs and IPs over time. An object that the user has applied an action to may be called an "object of action." Absence in the IP of the object of action corresponding to the one found at IR means that one should capture the IP again at a later time and try to find the object of action again. Finally, either an object of action may be found in the IP or execution of the scenario may be halted and a report generated describing how the wrong state was achieved and the scenario may not be continued. In embodiments of the present invention, this detection of objects of action may be done in real time during the playback phase, progressing from one action to another. Thus, the image analysis process employed must have good performance so as to introduce only a minimal disturbance to the time conditions at playback.

The CCF system of embodiments of the present invention comprises an image analysis and detecting process. Such a process has at least two requirements. First, the process should be able to overcome some variations in the captured images such as different color scheme, fonts, and the layout and state of the visual elements. In one embodiment, comparison constraints for checking these items (color scheme, fonts, etc.) may be set to specified parameters in accordance with specific needs. Overcoming these variations is desirable because recording and playback might be executed in different operating environments such as different screen resolutions, different visual schemes, different window layouts, and so on. Additionally, there could be insignificant differences in corresponding IR (usually captured after an action was applied to an object of interest) and IP pairs (captured after a previous action was completed). Second, the implementation of the image analysis and object detection process should be fast enough to introduce only minimal disturbances and delay of application execution during playback.

By processing captured images, the system builds descriptions of the images in terms of the objects presented on them. Each display object may be represented by its contour and a plurality of properties. Table I enumerates some possible contour properties for use in the present invention. In other embodiments, other properties may also be used.

TABLE 1

Contour properties

| Property | Description |
| --- | --- |
| Location | Coordinates (on the image) of the contour center. |
| Image size | Characteristic contour size. In case of rectangular contours they are just vertical and horizontal sizes. For controls of more complicated shape, another format may be used. |
| Layout | Connection to other contours that lay in proximity to its boundaries/layout pattern of this contour. |
| Content Type | Indicates what is inside of the contour: text, image or a combination. |
| Content | If the content type is text, then a text string; if image (e.g. icon), then the image. |

Figure 2:
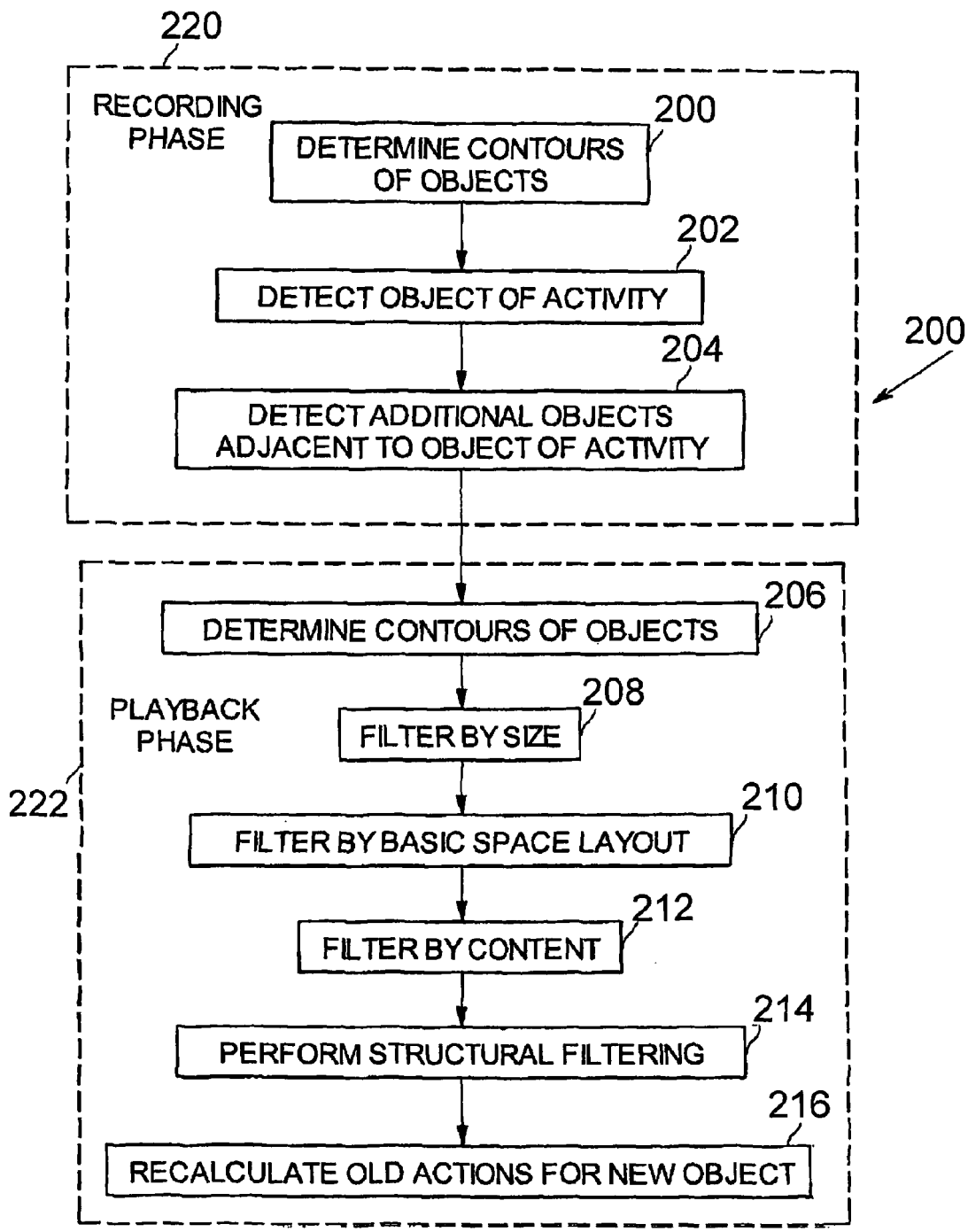
FIG. 2 is a flow diagram illustrating processing in a cognitive control framework according to an embodiment of the present invention.

FIG. 2 is a flow diagram illustrating processing of a CCF system according to an embodiment of the present invention. During the recording phase 220 handled by recording component 102, at block 200 the system determines contours of objects in the IR. At block 202, the system detects a current object of activity. At block 204, the system detects additional objects adjacent to the current object of activity in the IR. These steps (200, 202, and 204) may be repeated over time for all objects of activity during execution of the application program in the recording phase.

Next, during the playback phase 222 handled by playback component 104, at block 206 the CCF system determines the contours of objects in the IP. At block 208, the CCF system filters contours by size to determine contours that may become hypotheses for active objects and contours that connect them. At block 210, the CCF system filters the objects by basic space layout in the IP to determine subsets of hypotheses for active and additional objects. For example, filtering criteria for space layout may include tables, wizards, and menus. In one embodiment, the user (or CCF schema with a cascade search) could set both strict (e.g. "as is") and fuzzy (e.g. "object could be near each other") conditions. At block 212, the CCF system filters the objects by content to produce further subsets of hypotheses for active and additional objects. For example, the filtering criteria by content may include images and text. Moreover, in one embodiment, the user (or CCF schema with cascade search) could set both strict (e.g. "image should have difference in a few points and text should have minimal differences on a base of Levenstein distance") and fuzzy (e.g. "image could be stable to highlighting and have insignificant structural changes and text could have noticeable differences on a base of Levenstein distance without consideration of digits") conditions. At block 214, the CCF system performs structural filtering of the objects to produce a best hypothesis for active objects.

Finally, at block 216, the CCF system recalculates old actions for a new object by applying the action according to the execution scenario. For example, suppose the user selected (via the mouse) the screen location at (X=70, Y=200), and that a button is displayed at the rectangle denoted (X1=50, Y1=150, X2=100, Y2=100). In the IP, the button may be represented as a rectangle denoted (X1=250, Y1=300, X2=200, Y2=100). For a general view, coordinates of the top left corner and the size of the rectangle may be changed. The mouse click (user selection) may be recalculated based on the position of the button and the scaled size (for X and Y coordinates). The calculation gives the new mouse click coordinates (e.g., X=290, Y=350).

Table II shows the input data and output of the image analysis process for FIG. 2.

TABLE II

Image Analysis Processing

| Step | Input Data | Result | Input parameters and Description |
| --- | --- | --- | --- |
| 1. Contouring | Image from recoding (IR) | Contours | Thresholds, distances between objects (with some tolerance). Intel ® OpenCV library used in one embodiment. |
| 2. Detecting object of activity | Image IR and contours from previous step. | Contour representing object of activity | Typical object size (with tolerance) for object of action. Optical character recognition (OCR) and fuzzy text comparison, e.g. with Levenshtein distance. |
| 3. Detecting additional objects around object of activity | Image IR, contours and active objects. | Additional objects and their layout against object of action | Typical object size (with tolerance) for additional objects. Structural analysis, e.g. "criss-cross" rules. |
| 4. Contouring | Image from playback (IP) | Contours | Thresholds, distances between objects (with some tolerance). Intel ® OpenCV library used in one embodiment. |

TABLE II-continued

Image Analysis Processing

| Step | Input Data | Result | Input parameters and Description |
|---|---|---|---|
| 5. Filtering by size | Contours from previous step | Contours that become hypotheses for active object and contours connected with them | Mean object size (with tolerance) based on active object characteristics evaluated at Step 2. Typical object size (with tolerance) for additional objects. Filtering out contours that don't fit into input size limits. |
| 6. Filtering by basic space layout | Subsets of hypotheses for active and additional objects | Decreased subsets of hypotheses for active and additional objects | Fuzzy distance filtration. Fuzzy filtration for directions. |
| 7. Filtering by content | Subsets of hypotheses for active and additional objects | Decreased subsets of hypotheses for active and additional objects | OCR and fuzzy text comparison, e.g. with Levenshtein distance. Fuzzy image comparison. Using "fuzzy content type" method for filtration. |
| 8. Structural filtering | Subsets of hypotheses for active and additional objects | The best hypothesis for active objects. | Method based on fuzzy triple links both between objects from IR and their hypotheses from IP. It's stable to additional objects which don't have strong structural links with active object. Moreover, one can use the result of this method to choose the best hypotheses for active objects. Some other methods, e.g. Hough transformation may also be used here. |
| 9. Recalculating old actions for new object | Object of action | Applied the action according to the execution scenario | Recalculating action coordinates in IP (playback image) coordinate system |

During filtering at each step there is an evaluation of specific contour properties (as required for a specific filter). This filtering pipeline is designed in such a way that the most time consuming evaluation steps are shifted to later in the processing pipeline when the number of contours (hypotheses) is smaller. By using this approach, the overall computational cost may be decreased, thereby helping to ensure good performance of the system.

It is useful to maintain a compromise in order to make sure that the system does not filter out some contours in the early steps that may be later determined to be either a hypothesis of an object of activity or objects connected with an object of activity. In this regard, predefined input parameters may be set to broad limits that requires spending a little more time on processing of additional contours (hypotheses), but ensure that the system has not dropped important contours.

Example pseudo-code for one embodiment of the present invention is shown in Table III.

TABLE III

Pseudo Code Example

```
BEGIN CCF
<<<<<<<< Recording >>>>>>>>
LOOP /*recording, e.g. till a special key combination */
    Wait on user action /*mouse, keyboard, it's possible to set something else*/
    Hook and save screenshot /*e.g. <Screenshot fileName="1.png"/>*/
    Save time interval from the previous action /*e.g. <Sleep duration="2000"/>*/
    Save information about user action
        /*e.g. <Mouse action="RightClick" x="100" y="200"/>*/
```

TABLE III-continued

Pseudo Code Example

```
END LOOP /*recording, e.g. till a special key combination*/
EXIT
<<<<<<<< Post-processing >>>>>>>
Process saved data into a more compact form. It's possible for the user to change it for
his or her needs.
<<<<<<<< Playback >>>>>>
LOOP /*till the end of saved data*/
    Load time interval and wait in accordance with it.
        IF [actions depend on coordinates on the screen] /*e.g. mouse click*/ THEN
            Load saved screenshot
            Detect object of action /*e.g. button*/, nearest structure-layout /*e.g. menu items
around button*/ and other useful info on saved screenshot
                TimeConditions_label: Hook the current screenshot
                Use image processing to find the corresponding object on the current screenshot
/*it's possible to require more information from saved screenshot during search*/
            IF [Object not found] THEN
                IF [Check time condition] /*e.g. it's possible to repeat search 3 times with
1000-msec step, for example*/ THEN
                    GOTO TimeConditions_label
                ELSE
                    EXIT with error code /*moreover, it's possible to send corresponding report
to log-file*/
                END IF
            ELSE
                Recalculate actions on a base of new found objects /*e.g. recalculate new
coordinates for mouse click*/
            END IF
        END IF
Produce actions /*it could be changed actions after image processing; moreover, it's
possible to finish execution in case of wrong situations during actions*/
END LOOP /*till the end of saved data*/
EXIT
END CCF
```

Figure 3:
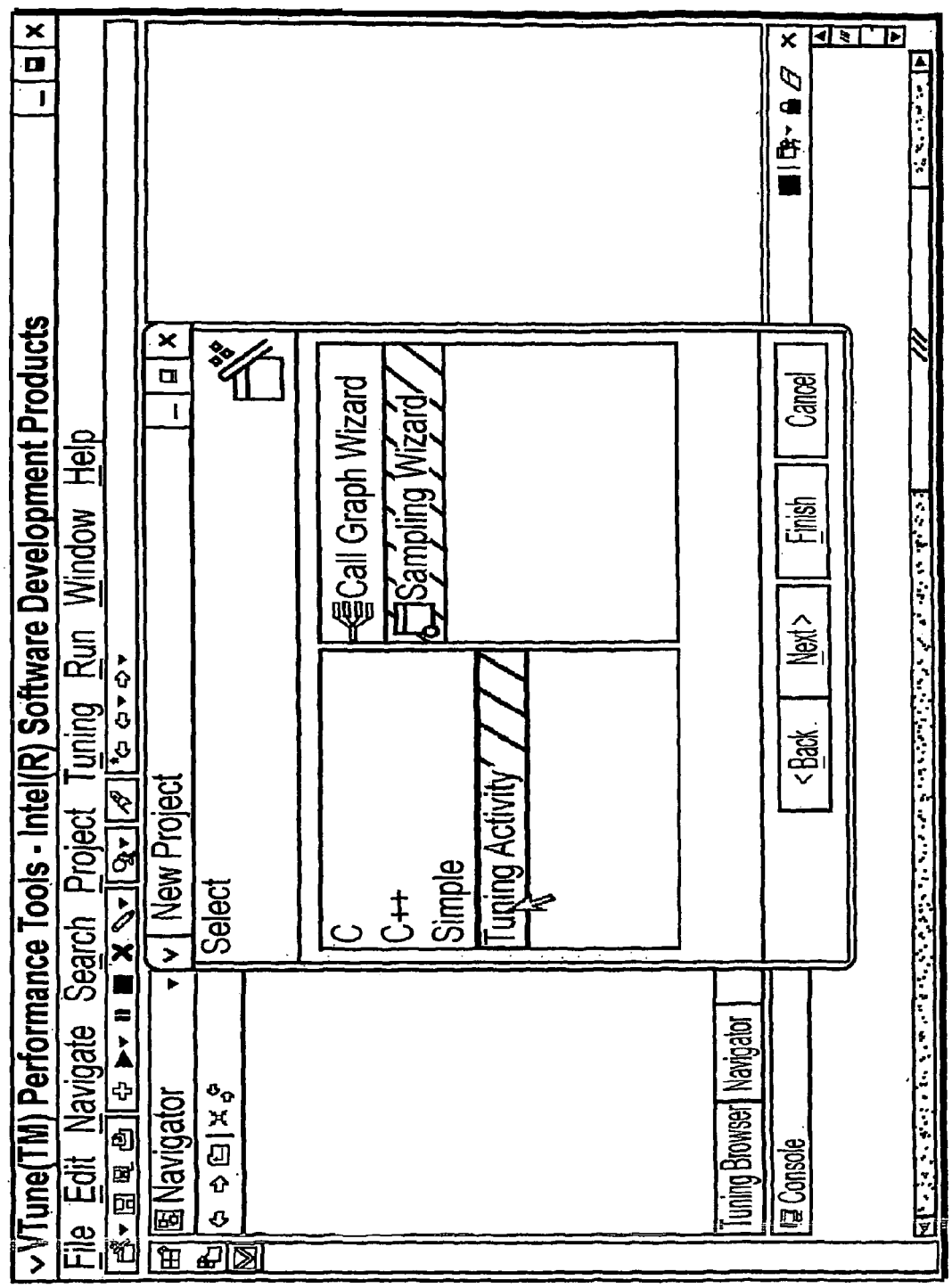
FIG. 3 is an example display of the GUI of an application program captured and saved during a recording phase.
Figure 4:
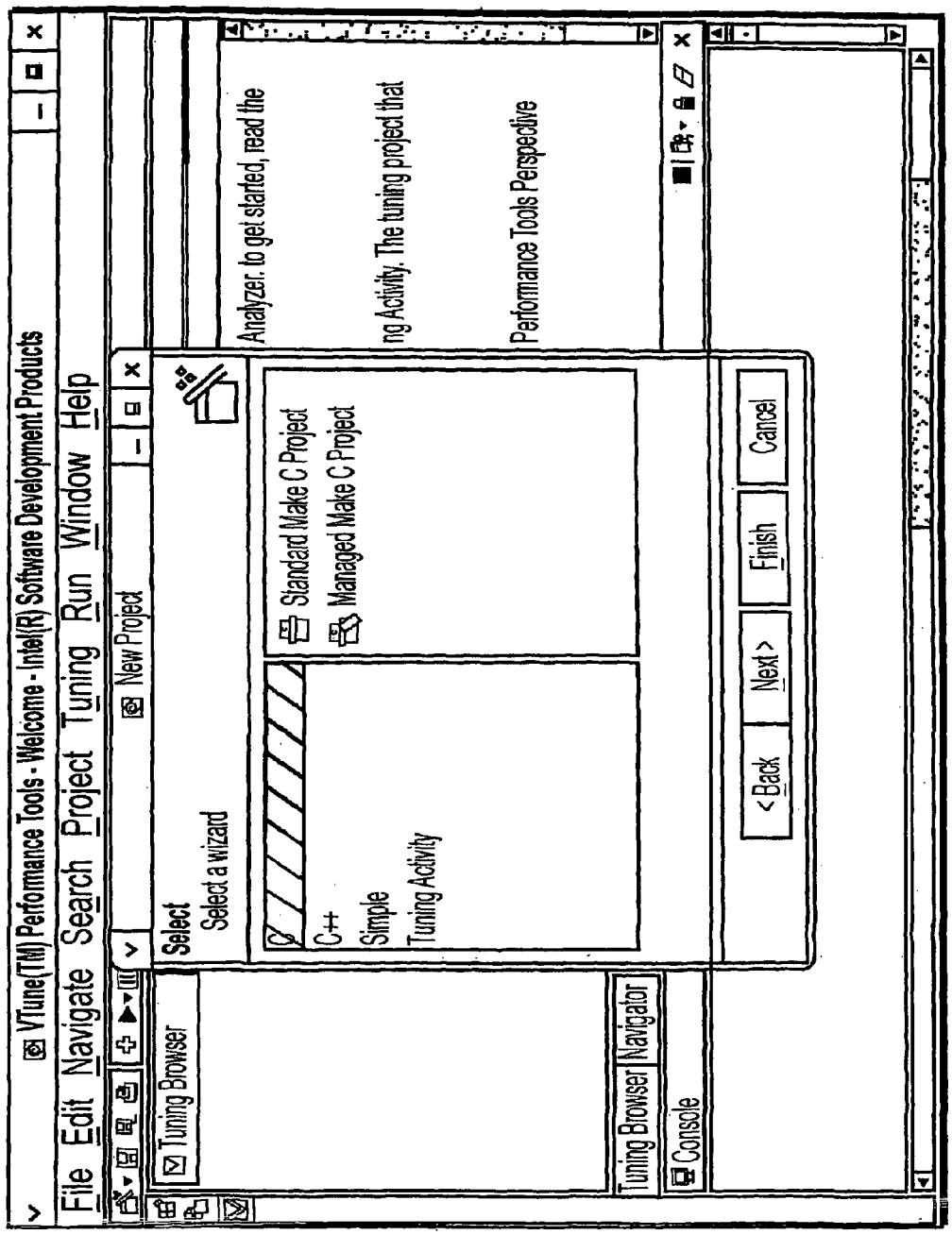
FIG. 4 is an example display of the GUI of an application program captured during a playback phase.
Figure 5:
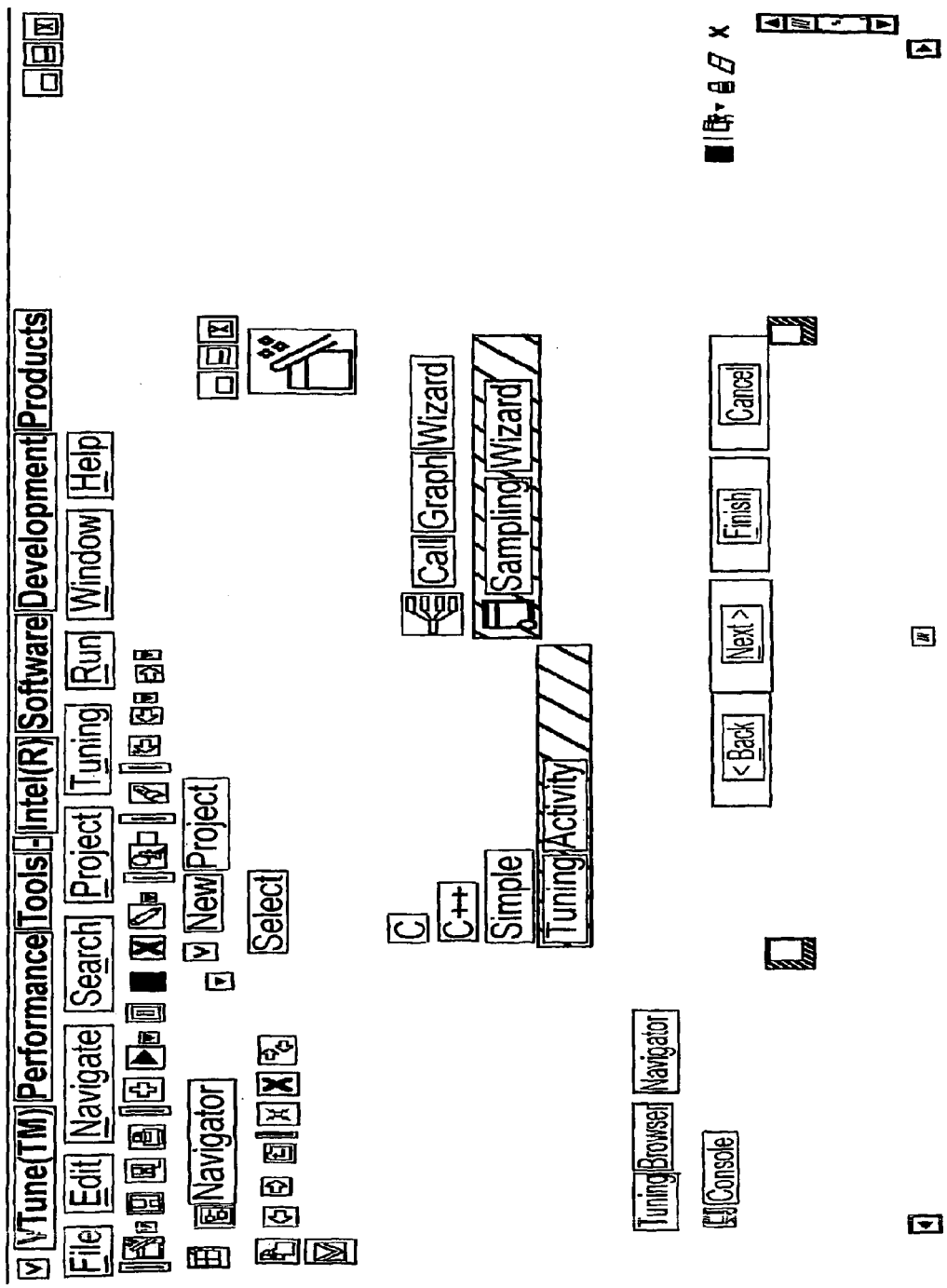
FIG. 5 is an example image illustrating objects identified during contouring operations of the recording phase according to an embodiment of the present invention.
Figure 6:
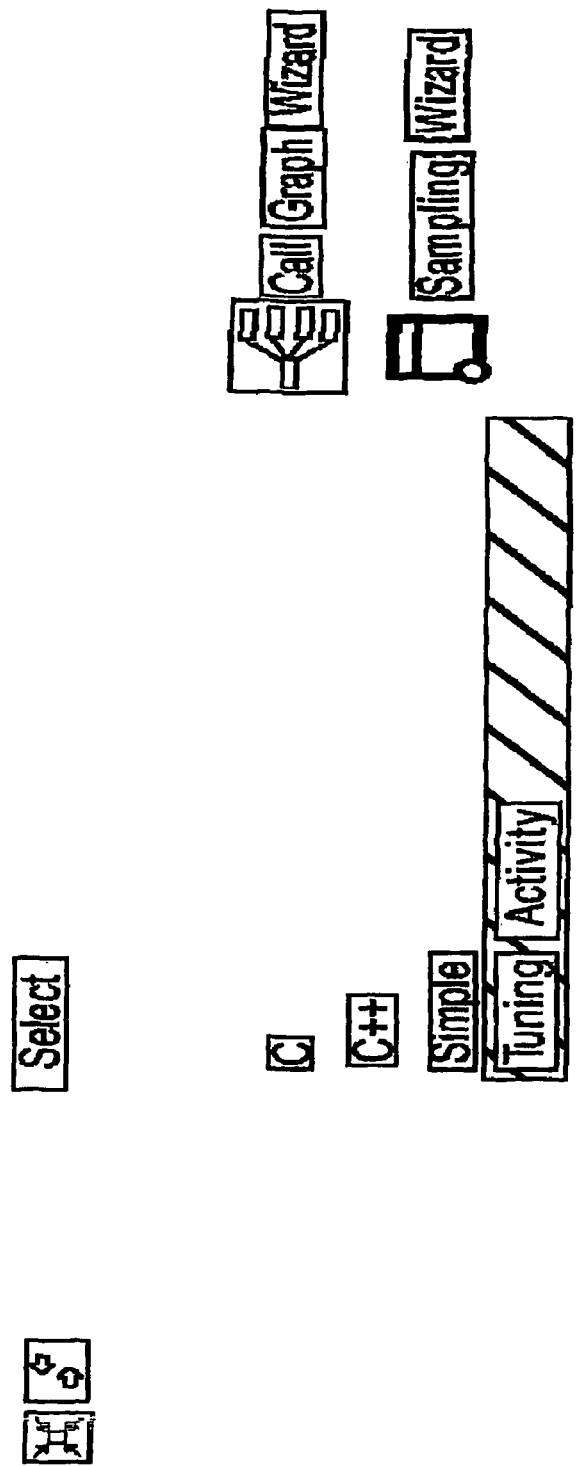
FIG. 6 is an example image illustrating objects of activity of the recording phase according to an embodiment of the present invention.
Figure 7:
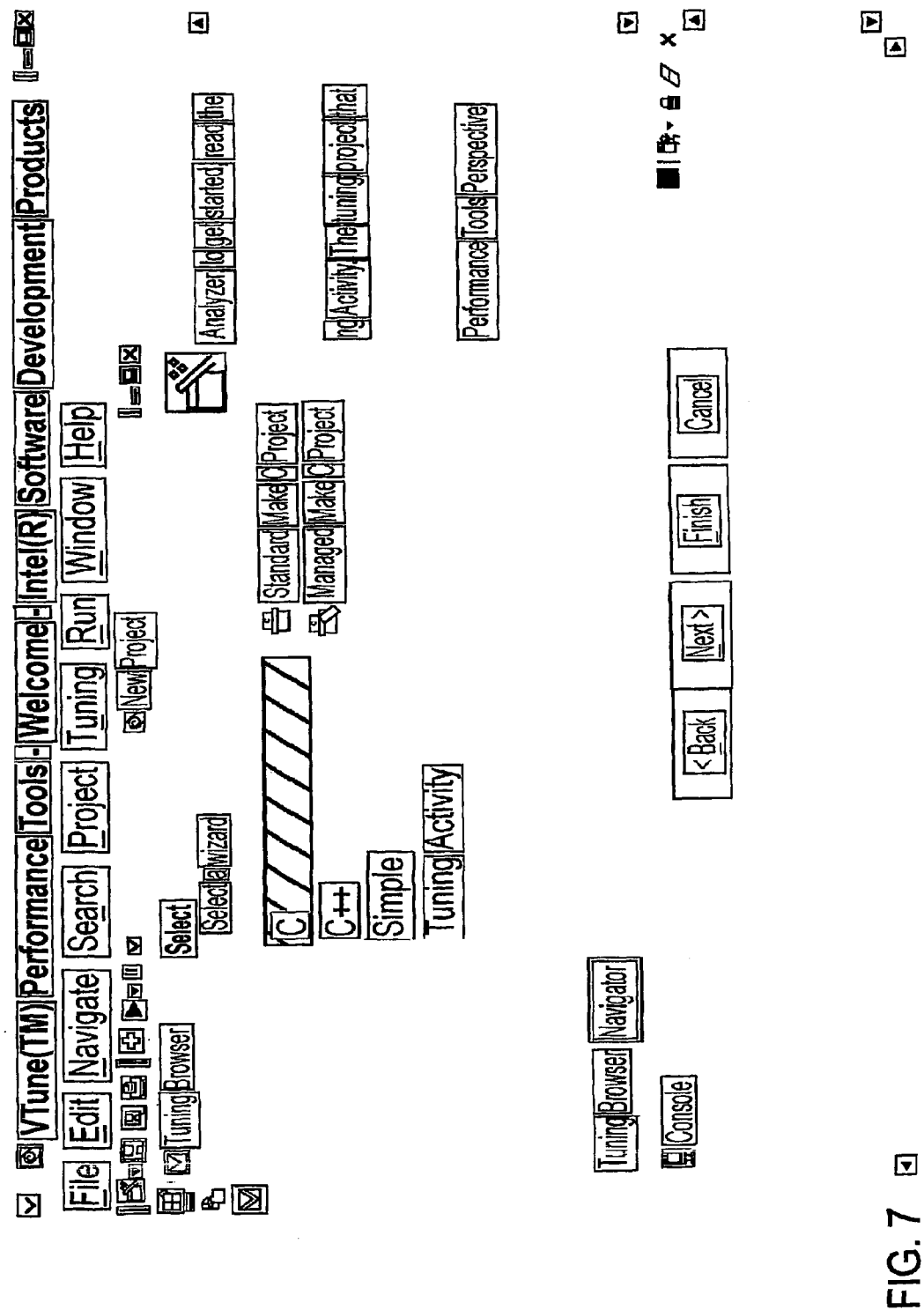
FIG. 7 is an example image illustrating objects identified during contouring operations of the playback phase according to an embodiment of the present invention.
Figure 8:
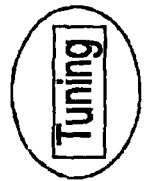
FIG. 8 is an example image illustrating a hypothesis during the playback phase according to an embodiment of the present invention.

Embodiments of the present invention including image analysis and object of activity detection on two images may be illustrated by the following examples using a performance analyzer application program. These figures show applying the process blocks of FIG. 2 to a first image from the recording phase (IR) and a corresponding image from the playback phase (IP). FIG. 3 is an example display of the GUI of an application program captured and saved during a recording phase. This IR screen shot shows that the item "Tuning Activity" was selected by the user using a mouse. FIG. 4 is an example display of the GUI of an application program captured during a playback phase. Note there are some insignificant changes in the displayed windows in comparison to FIG. 3. FIG. 5 is an example image illustrating objects identified during contouring operations of the recording phase according to an embodiment of the present invention as performed on the image of FIG. 3. FIG. 5 shows the sample output from block 200 of FIG. 2. FIG. 6 is an example image illustrating objects of activity of the recording phase according to an embodiment of the present invention as performed on the image of FIG. 5. These contours were identified after performing blocks 202 and 204 of FIG. 2 on the image from FIG. 5. The contour with the text labeled "Tuning" has been determined in this example to be the current object of activity. FIG. 7 is an example image illustrating objects identified during contouring operations of the playback phase according to an embodiment of the present invention. This image is output from performing block 206 of FIG. 2 on the sample image of FIG. 4. Finally, FIG. 8 is an example image illustrating a hypothesis during the playback phase according to an embodiment of the present invention. FIG. 8 shows hypotheses from FIG. 7 for the "Tuning Activity" object of activity from FIG. 6. Size, space, content, and structural filtration of blocks 206-214 has been performed. The ellipse represents the contour which was selected as the best hypothesis from performing block 216 of FIG. 2. A new point for the mouse click is recalculated relative to the given object (i.e., the "tuning" display object).

In some scenarios, filtration according to blocks 208 through 212 still result in many hypotheses to consider. When the number of hypotheses is large, more computational resources are needed. In one embodiment of the present invention, a triangular method for hypotheses filtration may be used to reduce the number of GUI hypotheses for objects in space (two dimensional (2D) for screen shots and multidimensional in the general case).

The triangular approach to hypotheses filtration may be understood with reference to an actual example (but a relatively simple example for purposes of explanation to avoid complex visual representations). Referring back to FIG. 3, a saved screen shot for one step during execution of an application program is shown.

GUI changes for this application program may become apparent during playback. For example, it could be GUI "noise" as a result of product evolution of the application program visual interface. In one example, it may result from using another OS with a different visual scheme. FIG. 4 presents the appearance of the application program for the other OS.

Figure 9:
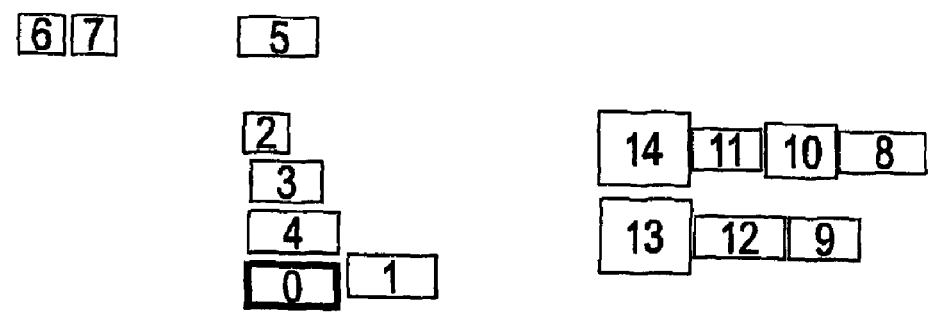

In this case, "soft" or "fuzzy" conditions may be used during the search of the GUI objects of FIG. 4. When using the CCF system, this results in generation of many hypotheses for GUI objects after applying "fuzzy" filters for sizes, shapes, text, images and distances. In this example, the user selected the "Tuning" word in the "Tuning Activity" item (of FIG. 3) and the search system uses a set of active and additional objects as shown on FIG. 9. FIG. 9 is an example image illustrating active and additional objects according to an embodiment of the present invention. All objects are enumerated and an active object has a bold border.

Figure 10:
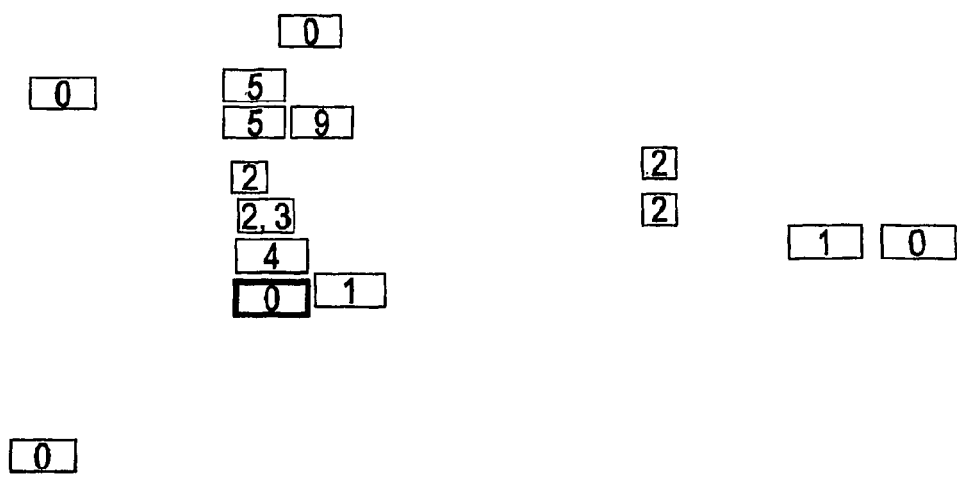
FIG. 10 is an example image illustrating active hypotheses from FIG. 4 for objects of FIG. 9 according to an embodiment of the present invention.

After pre-filtration (according to size, text, etc. as in block 208 through 212 of FIG. 2), many hypotheses may remain for the objects of FIG. 4. The term hypothesis as used herein means a contour of an object on the playback image which corresponds to a contour of an object on the saved image at a point in time. This means the previously applied filters didn't reject this correspondence of objects. FIG. 10 is an example image illustrating active hypotheses from FIG. 4 for objects of FIG. 9 according to an embodiment of the present invention. The numbers shown in each contour of FIG. 10 mean that the objects of FIG. 10 correspond to hypotheses for all objects with the given numbers from FIG. 9. Note that there are several hypotheses for the active object (#0).

Application of the triangular method of hypotheses filtration of an embodiment of the present invention within block 116 of FIG. 1 and block 214 of FIG. 2 decreases the number of active hypotheses. Note the triangular approach could filter all hypotheses if the current screen shot during playback has significant differences with the image saved during the recording phase. This fact allows the triangular approach to be employed for the identification of incorrect behavior of an application program under analysis.

Let's consider three points on the saved image: A, B, and C. Point C corresponds to a selected active object (e.g., a center point of a contour, or another point using any other rules to detect a contour). Points A and B correspond to any two additional objects. Connecting these points form a triangle. It is well known that any triangle can be described by two angles and one edge. For the present triangular filtration method, the $\lfloor ABC$ angle ($\alpha 0$), the $\lfloor BAC(\beta 0)$ angle, and the AB edge (d0, calculated as the Euclidean distance) are used.

Additionally, the triangular method of hypotheses filtration uses at least four rules $D(d0, \ldots)$; $F_d(d, \ldots)$; $F_\alpha(\alpha, \ldots)$; and $F_\beta(\beta, \ldots)$ returning Boolean values for distances and angles correspondingly (using variables d, $\alpha$ and $\beta$). In some embodiments, complex rules may be used, but for this example very simple ones may be used.

$$D_d(d0,D_0)=d0<D_0 \qquad \text{Rule 1.}$$

To decrease the number of triangles and get better results, an upper bound for the d0 distance is used. In other words, let's use triangles which have an edge AB (see above) that is less than $D_0$. This rule is used for triangles from the saved (the recorded) image.

$$\text{function } F_d(d,d0,Q_0)=d0*(1-|Q_0|)<=d<=d0*(1+|Q_0|) \qquad \text{Rule 2.}$$

This function filters distances (corresponding edges in triangles) which are outside of an interval based on the d0 and $Q_0$ (coefficient) values: $d0*Q_0$ dispersion with central point d0. In other words, let's use triangles where a corresponding edge is inside a detected interval. This rule is used for triangles from the current screen shot (the playback) image.

$$\text{function } F_\alpha(\alpha,\alpha 0,T_0)=\alpha 0-|T_0|<=\alpha<=\alpha 0+|T_0| \qquad \text{Rule 3.}$$

This function filters angles (corresponding ones in triangles) which are outside of an interval based on the $\alpha 0$ and $T_0$ (coefficient) values: $T_0$ dispersion with central point $\alpha 0$. In other words, let's use triangles where a corresponding angle is inside a detected interval. This rule is used for triangles from the current screen shot (the playback) image.

$$\text{function } F_\beta(\beta,\beta 0,T_0)=\beta 0-|T_0|<=\beta<=\beta 0+|T_0| \qquad \text{Rule 4.}$$

This function filters angles (corresponding ones in triangles) which are outside of an interval based on the $\alpha 0$ and $T_0$ (coefficient) values: $T_0$ dispersion with central point $\beta 0$. In other words, we use triangles where corresponding angle is inside detected interval. This rule is used for triangles from the current screen shot (the playback) image.

In the above-defined rules, $D_0$ is the upper bound between additional objects (this decreases the number of hypotheses pairs and reduces negative effects for the triangular filtration algorithm); $Q_0$ is a coefficient denoting an interval distance, and $T_0$ is a tolerance for angles for further analysis of hypotheses. Note one $T_0$ coefficient may be considered for both angles because a symmetrical approach is used.

Figure 11:
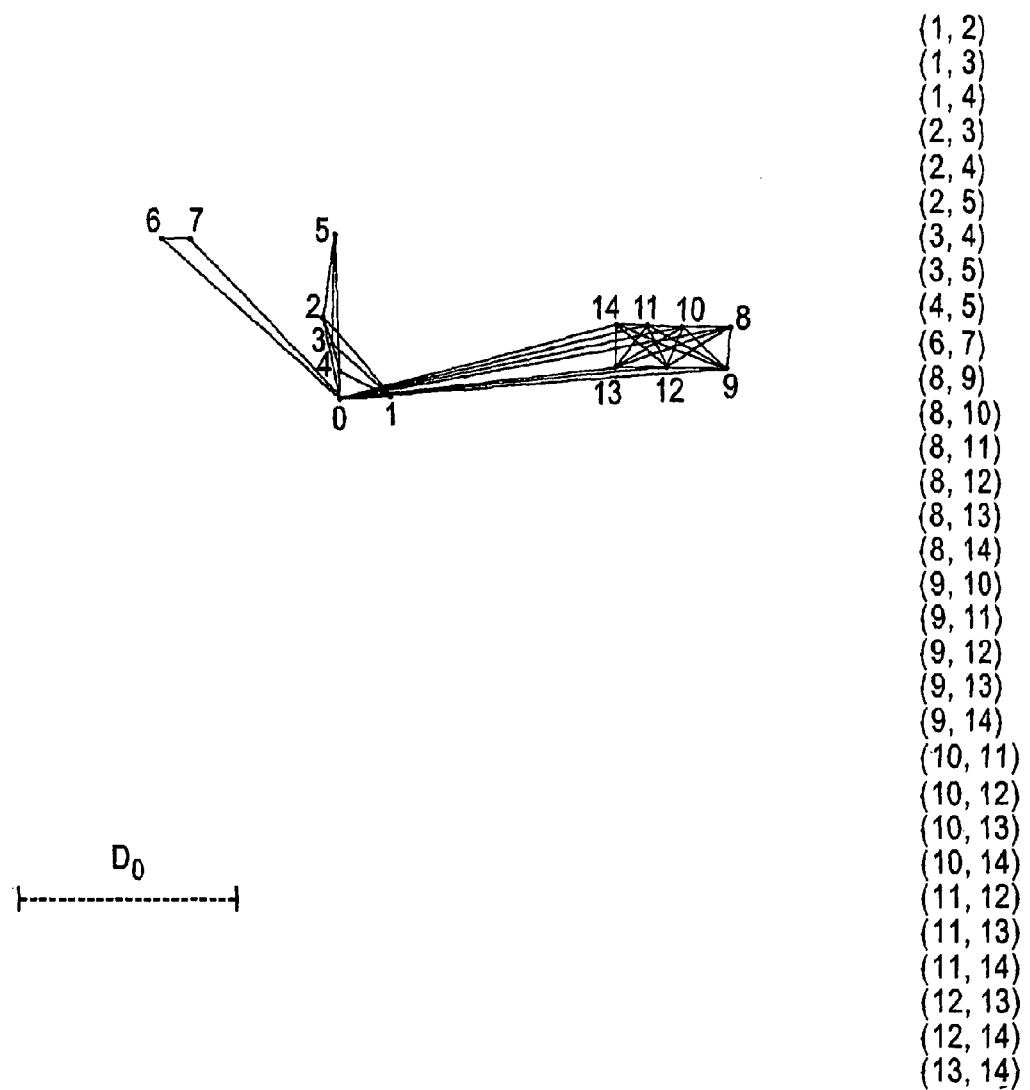
FIG. 11 is an example image illustrating possible triangles according to an embodiment of the present invention.
Figure 12:
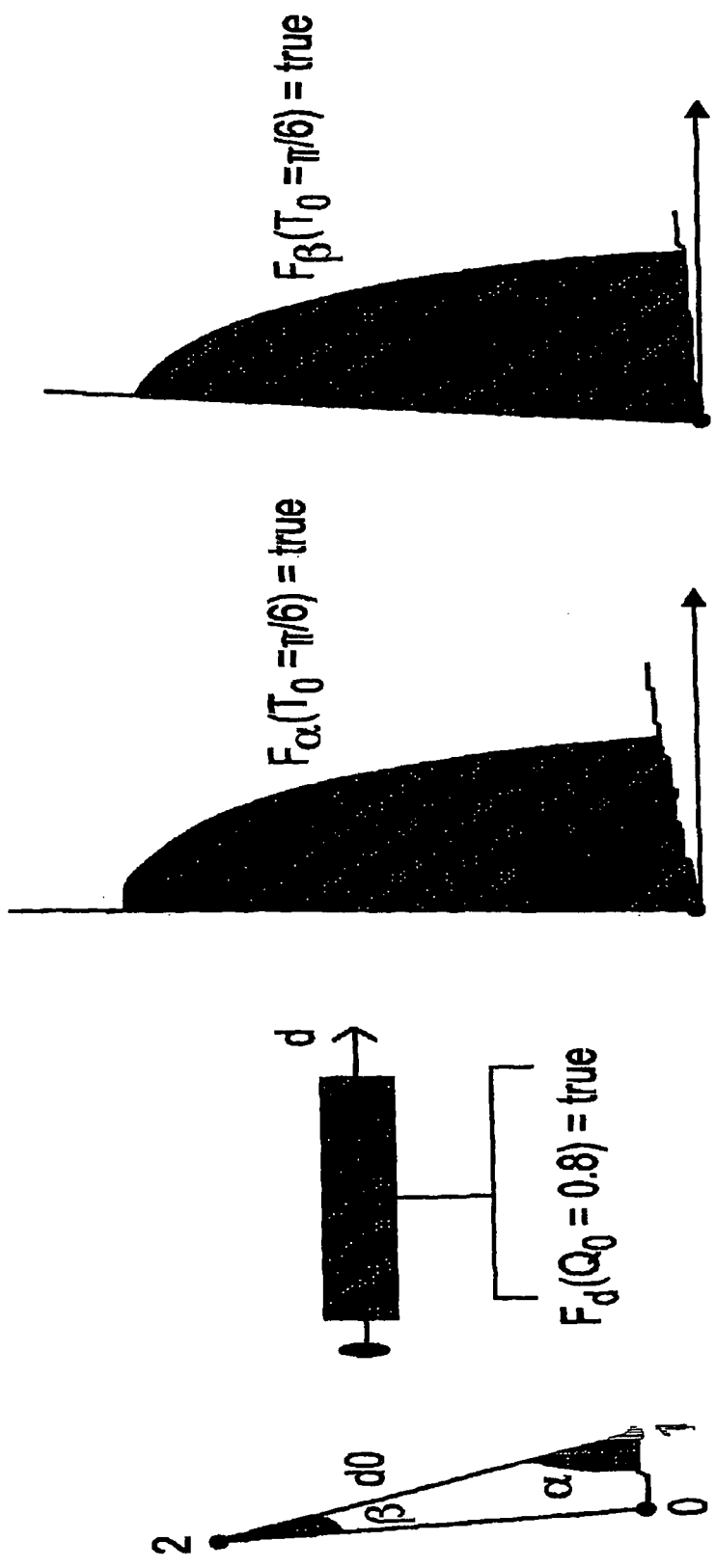
FIG. 12 is an image illustrating possible true values for distances and angles according to an embodiment of the present invention.

FIG. 11 is an example image illustrating possible triangles according to an embodiment of the present invention. FIG. 11 presents all possible triangles for objects of FIG. 9 based on application of the first rule (i.e., the $D(d0, \ldots)$ rule) when $D_d$ is true. FIG. 12 is an image illustrating possible true values for distances and angles according to an embodiment of the present invention. This figure is a visual representation of the rules. FIG. 12 presents one triangle from FIG. 11 for the points consisting of two additional objects (object #1, object #2) and the active one (object #0). Possible true-value distances and angles for $F_d$, $F_\alpha$ and $F_\beta$ are also indicated.

Figure 13:
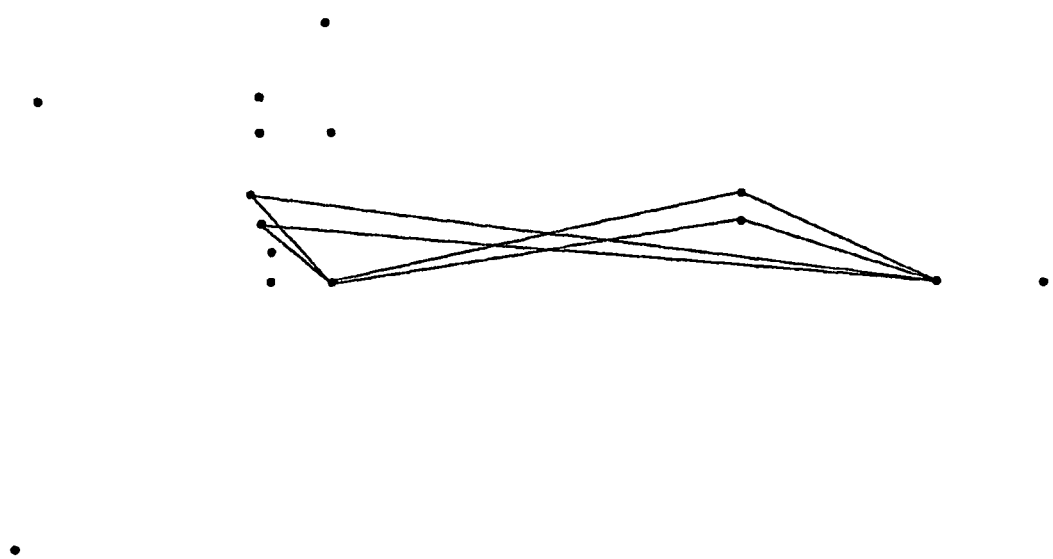
FIG. 13 is an example image illustrating all pairs of hypotheses for additional objects according to an embodiment of the present invention.

Let's consider all hypotheses for objects #1 and #2 and possible hypotheses pairs (one hypothesis for object #1 and one hypothesis for #2). FIG. 13 is an example image illustrating all pairs of hypotheses for additional objects according to an embodiment of the present invention. FIG. 13 represents all of these pairs by connected lines. The figure doesn't show the contours of objects represented by the hypotheses in order to make the given representation simple (only the central points art indicated).

Figure 14:
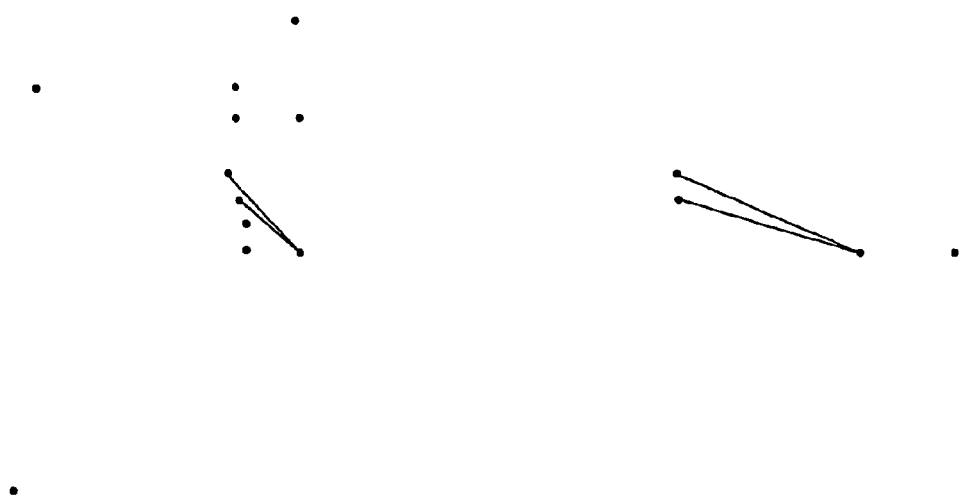
FIG. 14 is an example image illustrating possible pairs of hypotheses for additional objects after filtration according to an embodiment of the present invention.

FIG. 14 is an example image illustrating possible pairs of hypotheses for additional objects after filtration according to an embodiment of the present invention FIG. 14 shows possible pairs from FIG. 13 after filtration in accordance with the second rule (i.e., the $F_d$ rule).

Figure 15:
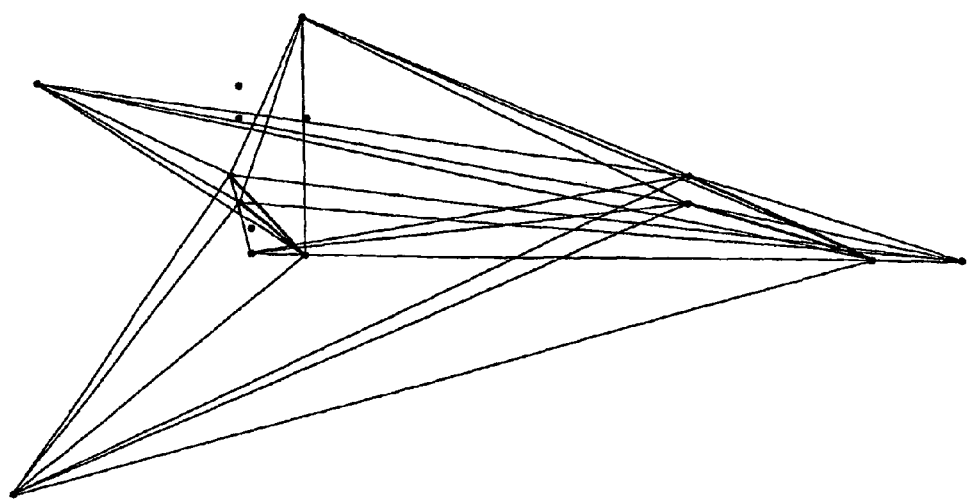
FIG. 15 is an example image illustrating all triangles for pairs of hypotheses for additional objects and hypotheses for the active object according to an embodiment of the present invention.

FIG. 15 is an example image illustrating all triangles for pairs of hypotheses for additional objects and hypotheses for the active object according to an embodiment of the present invention. FIG. 15 represents all triangles for hypotheses pairs from FIG. 14 and hypotheses for the active object (#0). Bases of triangles are indicated by bold lines.

Figure 16:
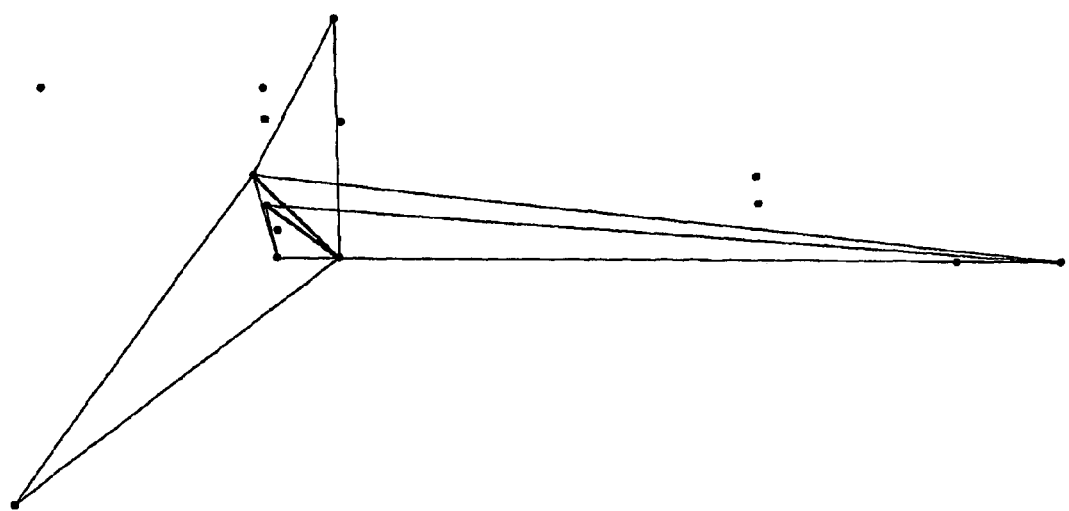
FIG. 16 is an example image illustrating all possible triangles from FIG. 15 after filtration according to an embodiment of the present invention.

Triangles may then be filtered from FIG. 15 according to the third and fourth rules (i.e., with the $F_\alpha$ and $F_\beta$ rules) applied to corresponding angles. The result is shown on FIG. 16. FIG. 16 is an example image illustrating all possible triangles from FIG. 15 after filtration according to an embodiment of the present invention.

Figure 17:
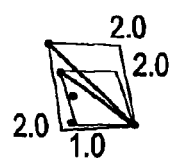
FIG. 17 is an example image illustrating similar triangles after changes for FIG. 16 according to an embodiment of the present invention.

Some triangles on FIG. 16 are dissimilar to a triangle from FIG. 12. Let's change triangles on FIG. 16 into similar ones: the direction may be found by drawing a perpendicular on line between a pair of hypotheses for additional objects and the angles are ($\alpha 0$, $\beta 0$). The new triangle should have the same base edge between a pair of hypotheses. This edge detects a half plane where a third vertex both for old and new triangles should take place. Corresponding angles for the new triangle should be equal to $\alpha 0$ and $\beta 0$. Corresponding changes are represented on FIG. 17. FIG. 17 is an example image illustrating similar triangles after changes have been made according to an embodiment of the present invention.

Now let's consider vertices of the triangles which correspond with hypotheses for active objects. Some vertices could coincide with other vertices (i.e., multiple vertices may occupy the same point in the coordinate system) and their weight fox purposes of the present invention equals 1.0 multiplied by the number of vertices coincident there.

Figure 18:
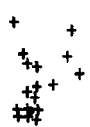
FIG. 18 is an example image illustrating all apexes for triangles (represented as crosses) and hypotheses for the active object (represented as circles) according to an embodiment of the present invention.

In this simple example, only additional objects #1 and #2 were considered. It's necessary to do the same steps for all triangles shown in FIG. 11. FIG. 18 is an example image illustrating all vertices for triangles (represented as crosses) and hypotheses for the active object (represented as dots) according to an embodiment of the present invention. FIG. 18 represents all vertices in accordance with this approach. Note that some objects could have no hypotheses. It doesn't affect the present method.

Every vertex-point on FIG. 18 has an associated weight ($\omega$) as indicated above. Let's consider distances between these vertices and points for hypotheses of the active object (#0). In different embodiments of the present invention, different functions may be used. In one embodiment, the Euclidean distance, coefficient $Q_E$ and simple bound $Q_B$ may be used to filter long distances to produce a double precision floating point value:

$$E_0(C_0, C) = [(C_{0X} - C_X)^2 - (C_{0Y} - C_Y)^2]^{1/2};$$

$$E(C_0, C, Q_E, Q_B) =$$

$$|Q_B|; \{\omega * \exp[-|Q_E| * E_0(C_0, C, Q_E)], \text{ if } E_0(C_0, C, Q_E) <=$$

0.0, otherwise;

where $C_{0X}$, $C_X$ are x-coordinates and $C_{0Y}$, $C_Y$ are y-coordinates for corresponding $C_0$, C points.

$E_0$ is the Euclidian distance between points. Special distance E sets better values for points which have smaller $E_0$ distances (nearer) taking into account weight $\omega$ and additional coefficient $Q_E$. E sets zero-values for far points also based on upper bound ($Q_B$).

The weight W for each hypothesis of the active object (#0) may be recalculated using the following formula (although in other embodiments, other formulas may be used) to produce a double precision floating point value:

$$W(C_0, Q_E, Q_B) = \sum_C E(C_0, C, Q_E, Q_B).$$

For point $C_0$, $W(C_0, Q_E, Q_B)$ means the accumulated sum of E-distances between this point and all corresponding vertices.

The last parameter for the filter of embodiments of the present invention is a simple weight bound $Q_W$ for every hypothesis of active object (#0) to produce a Boolean indicator I according to a fifth rule:

$$I(C_0, Q_E, Q_B, Q_W) = |Q_W| <= W(C_0, Q_E, Q_B) \qquad \text{Rule 5.}$$

This rule filters the $C_0$ point if the corresponding $W(C_0, Q_E, Q_B)$ has low value (less than low bound $|Q_W|$).

For this example, one hypothesis remains after the filtration operations (e.g., for very soft parameters $Q_B$=200.0, $Q_E$=0.05 and $Q_W$=0.005). This is the correct hypothesis. Sometimes, some incorrect hypotheses may be generated, but their weights are less than the weight of the correct hypothesis. This demonstrates the effectiveness of the triangular method of embodiments of the present invention both for reducing the number of hypotheses and indicating the best (the right) one. Note that the present method works very well without fine tuning of parameters. It was proved using the Cognitive Control Framework for analyzing different GUI applications under several different operating systems. The power of the present method is especially noticeable for screen shots with many similar GUI objects.

The present triangular approach may be used for multidimensional space without any changes. The Euclidean distance may be used for the corresponding space only. Some simple experiments demonstrated good effectiveness of the method for three dimensional (3D) space, so the method could be recommended for corresponding control systems.

Note that an additional filter is not used for this example, although it may be useful to apply filtration based on tolerances for lengths of perpendiculars in triangles (drawn from a point of the active object for a recorded image and from corresponding hypotheses for the current screen shot).

Figure 19:
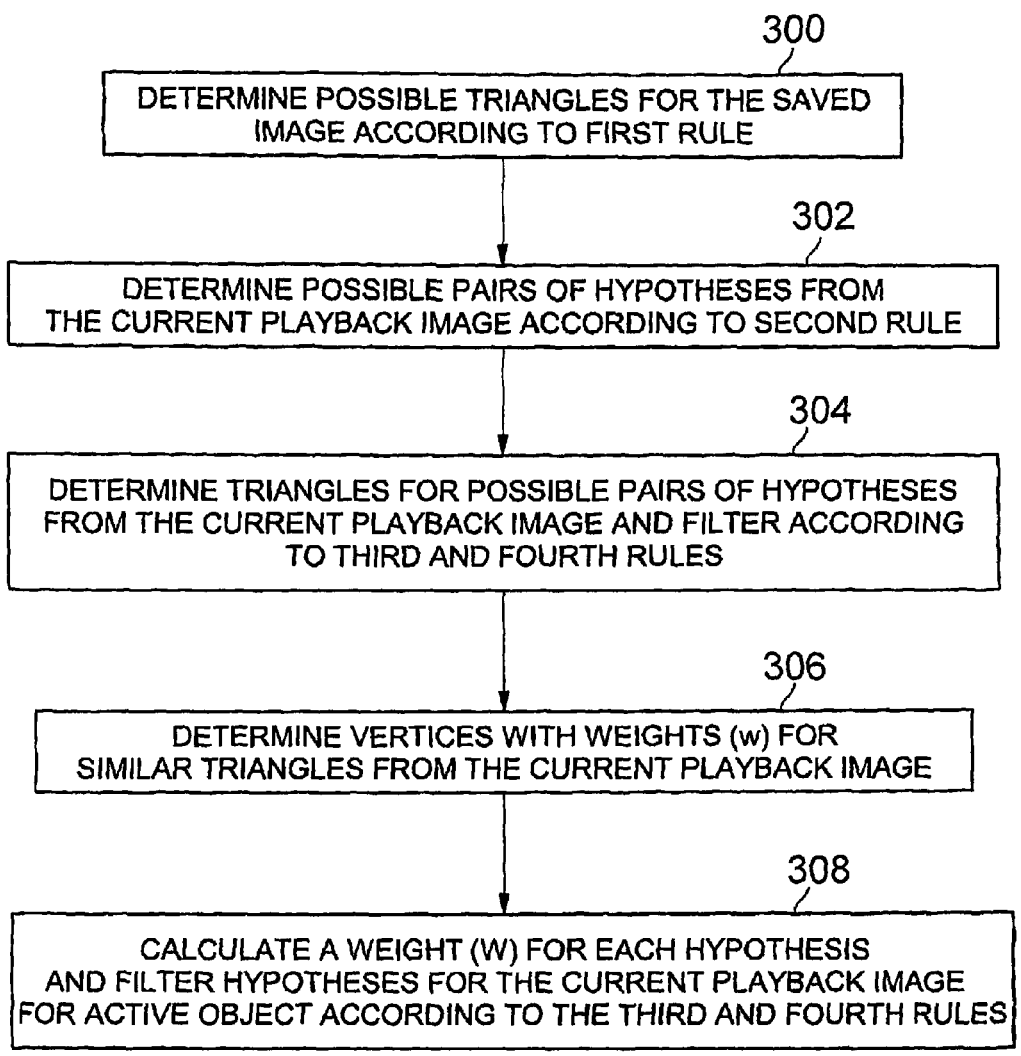
FIG. 19 is a flow diagram illustrating triangular filtration of hypotheses during the playback phase according to an embodiment of the present invention.

FIG. 19 is a flow diagram illustrating triangular filtration of hypotheses during the playback phase according to an embodiment of the present invention. At block 300, possible triangles for a saved image may be determined according to the first rule ($D_d(d0, D_0)=d0<D_0$), the vertices of a triangle being the points where the active object and any two additional objects of the saved image are located. At block 302, possible pairs of hypotheses in the current playback image may be determined according to the second rule ($F_d(d, d0, Q_0)=d0*(1-|Q_0|)<=d<=d0*(1+|Q_0|)$). Each one of the pair of hypotheses corresponds to one of the current two additional objects. At block 304, triangles for possible pairs of hypotheses in the current playback image may be determined according to the third ($F_\alpha(\alpha, \alpha0, T_0)=\alpha0-|T_0|<=\alpha<=\alpha0+|T_0|$) and fourth ($F_\beta(\beta, \beta0, T_0)=\beta0-|T_0|<=\beta<=\beta0+|T_0|$) rules. Next, at block 306, vertices with weights ($\omega$) may be determined for similar triangles in the current playback image. At block 308, a weight W may be calculated for every hypothesis of an active object and hypotheses of the current playback image filtered for the active object according to the weight bound of the fifth rule ($I(C_0, Q_E, Q_B, Q_W)=|Q_W|<=W(C_0, Q_E, Q_B)$). The result is that the triangular approach identifies the correct hypothesis.

The triangular approach to hypotheses filtration has at least several advantages. A first advantage of this approach is that it is applicable to any application program exposing a visual interface on any platform and operating system, and is not dependent on a specific API, or architecture of visual system implementation (like Win32 or X-Windows API), or specific operating system. It correlates with an advantage of the overall Cognitive Control Framework approach, which works across platforms. All other known systems are dependent to a small or big extent on system APIs while working with visual elements. A second advantage of this approach is that it is an easy way to significantly decrease the number of hypotheses for active objects. A third advantage is that it is an easy way to help with automatic portability of old scenarios to new versions of products. It decreases the time needed to support a base of scenarios for application program testing. A fourth advantage is that the triangular method does not require significant computing resources compared to other methods. It introduces only minimal disturbance and delay in application execution during playback.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Although the operations detailed herein may be described as a sequential process, some of the operations may in fact be performed in parallel or concurrently. In addition, in some embodiments the order of the operations may be rearranged without departing from the scope of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method of reducing the number of hypotheses for locations of an active object in a saved image generated by a graphical user interface (GUI) of an application program comprising:
    determining possible triangles for the saved image, wherein vertices of the triangles are points where the active object and any two additional objects of the saved image are located;
    determining possible pairs of hypotheses corresponding to the two additional objects from a current playback image corresponding to the saved image;
    determining triangles corresponding to the possible pairs of hypotheses and filtering the detected triangles;
    determining vertices with weights for similar triangles of the current playback image; and
    calculating, at a processor, a weight for every hypothesis of the active object and filtering hypotheses of the active object on the current playback image based on a weight bound.

2. The method of claim 1, wherein determining possible triangles comprises decreasing the number of possible triangles by using only triangles having an edge between two additional objects whose length is less than a predetermined distance.

3. The method of claim 1, wherein determining possible pairs of hypotheses comprises decreasing the number of possible triangles by using only triangles which have an edge between two additional objects whose length is within a calculated interval based on a first coefficient value.

4. The method of claim 1, wherein determining triangles corresponding to the pairs of hypotheses comprises decreasing the number of triangles by using only triangles which have angles within a calculated interval based on a second coefficient value.

5. The method of claim 1, wherein a weight of a selected vertex of a triangle comprises 1.0 multiplied by the number of vertices of other triangles coincident at the selected vertex.

6. The method of claim 1, wherein calculating a weight for every hypothesis of the active object comprises calculating the sum of distances between the location of the hypothesis and all corresponding vertices using a third coefficient value and an upper bound value.

7. The method of claim 1, wherein filtering the hypotheses of the active object comprises filtering a hypothesis if the calculated weight of the hypothesis is less than the weight bound.

8. The method of claim 1, further comprising identifying the best hypothesis for the active object based on the filtering.

9. An article comprising: a storage medium readable by a processor, the storage medium having store thereon instructions, which when executed, result in reducing the number of hypotheses for locations of an active object in a saved image generated by a graphical user interface (GUI) of an application program by
    determining possible triangles for the saved image, wherein vertices of the triangles are points where the active object and any two additional objects of the saved image are located;
    determining possible pairs of hypotheses corresponding to the two additional objects from a current playback image corresponding to the saved image;
    determining triangles corresponding to the possible pairs of hypotheses and filtering the detected triangles;
    determining vertices with weights for similar triangles of the current playback image; and
    calculating a weight for every hypothesis of the active object and filtering hypotheses of the active object on the current playback image based on a weight bound.

10. The article of claim 9, wherein instructions to determine possible triangles comprise instructions to decrease the number of possible triangles by using only triangles having an edge between two additional objects whose length is less than a predetermined distance.

11. The article of claim 9, wherein instructions to determine possible pairs of hypotheses comprise instructions to decrease the number of possible triangles by using only triangles which have an edge between two additional objects whose length is within a calculated interval based on a first coefficient value.

12. The article of claim 9, wherein instructions to determine triangles corresponding to the pairs of hypotheses comprise instructions to decrease the number of triangles by using only triangles which have angles within a calculated interval based on a second coefficient value.

13. The article of claim 9, wherein a weight of a selected vertex of a triangle comprises 1.0 multiplied by the number of vertices of other triangles coincident at the selected vertex.

14. The article of claim 9, wherein instructions to calculate a weight for every hypothesis of the active object comprise instructions to calculate the sum of distances between the location of the hypothesis and all corresponding vertices using a third coefficient value and an upper bound value.

15. The article of claim 9, wherein instructions to filter the hypotheses of the active object comprise instructions to filter a hypothesis if the calculated weight of the hypothesis is less than the weight bound.

16. The article of claim 9, further comprising instructions to identify the best hypothesis for the active object based on the filtering.

17. A cognitive control framework system for automatically controlling execution of an application program having a graphical user interface comprising:
  a recording component comprising hardware, adapted to capture user input data and images displayed by the graphical user interface during a recording phase of execution of the application program, and to analyze the captured user input data and displayed images to generate an execution scenario during the recording phase; and
  a playback component adapted to perform image analysis on images displayed by the graphical user interface as a result of processing the simulated user input data during the playback phase and captured displayed images from the recording phase by, the playback component being adapted to reduce the number of hypotheses for locations of an active object in a saved image generated by a graphical user interface (GUI) of an application program by, at a processor:
    determining possible triangles for the saved image, wherein vertices of the triangles are points where the active object and any two additional objects of the saved image are located;
    determining possible pairs of hypotheses corresponding to the two additional objects from a current playback image corresponding to the saved image;
    determining triangles corresponding to the possible pairs of hypotheses and filtering the detected triangles;
    determining vertices with weights for similar triangles of the current playback image; and
    calculating a weight for every hypothesis of the active object and filtering hypotheses of the active object on the current playback image based on a weight bound.

18. The system of claim 17, wherein determining possible triangles comprises decreasing the number of possible triangles by using only triangles having an edge between two additional objects whose length is less than a predetermined distance.

19. The system of claim 17, wherein determining possible pairs of hypotheses comprises decreasing the number of possible triangles by using only triangles which have an edge between two additional objects whose length is within a calculated interval based on a first coefficient value.

20. The system of claim 17, wherein determining triangles corresponding to the pairs of hypotheses comprises decreasing the number of triangles by using only triangles which have angles within a calculated interval based on a second coefficient value.

21. The system of claim 17, wherein a weight of a selected vertex of a triangle comprises 1.0 multiplied by the number of vertices of other triangles coincident at the selected vertex.

22. The system of claim 17, wherein calculating a weight for every hypothesis of the active object comprises calculating the sum of distances between the location of the hypothesis and all corresponding vertices using a third coefficient value and an upper bound value.

23. The system of claim 17, wherein filtering the hypotheses of the active object comprises filtering a hypothesis if the calculated weight of the hypothesis is less than the weight bound.

24. The system of claim 17, wherein the playback component is adapted to identify the best hypothesis for the active object based on the filtering.

* * * * *